May 4, 1937.    E. J. HOUDRY    2,078,945
CATALYTIC MATERIALS AND PROCESS OF MANUFACTURE
Original Filed March 23, 1932

INVENTOR
Eugene J Houdry
BY
Ira L. Nickerson
ATTORNEY

Patented May 4, 1937

2,078,945

UNITED STATES PATENT OFFICE 2,078,945

CATALYTIC MATERIALS AND PROCESS OF MANUFACTURE

Eugene J. Houdry, Ardmore, Pa., assignor to Houdry Process Corporation, Dover, Del., a corporation of Delaware Application March 23, 1932, Serial No. 600,581
Renewed July 3, 1936

7 Claims. (Cl. 23—233)

This invention relates to contact materials for producing or promoting chemical transformations generally, such, for example, as those comprehended by the terms synthesis, decomposition, metathesis, and the like. More particularly, it concerns active contact materials of the type having a pronounced selective adsorptive effect. An important field for their use lies in the transformation of organic compounds, but is by no means restricted thereto.

The value of certain natural earths, such as various varieties of clays, fuller's earth, diatomaceous earth, etc., as catalytic treating and filtering agents, has long been recognized. It is also well known that the catalytic or adsorptive power of many of such agents may be increased by treatment with sulphuric or hydrochloric acid. Many attempts have been made to use such agents especially with hydrocarbons, as in the cracking, purifying and refining of petroleum. The results, however, have been rather disappointing, except when used material was constantly replaced by fresh material, due largely to the fact that materials heretofore used have become more and more inactive with each regeneration until they were finally exhausted and had to be thrown away. In some cases no successful method of regeneration has been discovered. A possible cause is the lack of definite knowledge of the chemical composition which will retain its catalytic activity in spite of constantly recurring periods of operation and regeneration.

One object of the invention is to determine the composition of contact materials which will continue to have undiminished catalytic activity after many regenerations. Another object is to devise ways and means for putting the contact materials in such forms as will best promote desirable reactions while permitting frequent regenerations without loss of catalytic power. Other objects will be apparent from the detailed description which follows.

After long continued research and experimentation I have discovered that clays or earths of the type commonly referred to as hydrosilicates of aluminum (having as their principal components $SiO_2$, $Al_2O_3$, $Fe_2O_3$, $CaO$, $MgO$) under certain conditions and with certain proportional variations of components are capable of retaining a high degree of catalytic activity for a long period, if not indefinitely, in spite of frequent regenerations, even by oxidation. Each component undoubtedly has some catalytic activity, but the permissible limits in obtaining the objects of the invention appear to be as follows:

| | Percent |
|---|---|
| Silicon oxide ($SiO_2$) | 70 to 80 |
| Aluminum oxide ($Al_2O_3$) | 20 to 10 | the remaining components comprising particularly:

| | |
|---|---|
| Ferric oxide ($Fe_2O_3$) | |
| Calcium oxide ($CaO$) | not over 10% |
| Magnesium oxide ($MgO$) | |

Clays or earths of the above compositions will ordinarily not be single substances or natural minerals, but rather products derived by processing natural minerals. Whether natural or derived products, it is essential that they meet the requirements both of high content of silicon and aluminum oxides and the restricted combined percentage of the oxides of iron, calcium and magnesium. The weight ratio of silica to alumina is not less than 3½ to 1, and usually 4 to 1, or somewhat higher.

Of the last group of components, the ferric oxide appears to have a critical relation to the capacity of the material for regeneration and should not exceed three per cent. of the total. A preferred material giving highly satisfactory results has substantially the following composition:

| | Percent |
|---|---|
| $SiO_2$ | 76 |
| $Al_2O_3$ | 16.8 |
| $Fe_2O_3$ | 1.6 |
| $CaO$ | 2.4 |
| $MgO$ | 1.3 |

In this it will be noted that silicon oxide and aluminum oxide together make up substantially 93% of the material, leaving only about 7% for the other substances of which approximately 1½% is ferric oxide.

While the above material may be used in so-called contact processes in which, in comminuted form, it is agitated with the substance which is to be transformed, it is preferable to segregate the catalytic material so as to permit its convenient regeneration in situ. For this purpose, the catalytic material may be formed into rigid masses or units. By way of illustration, certain desirable forms are illustrated in the accompanying drawing, in which.

Figure 1:
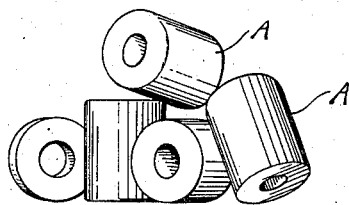
Figs. 1, 2 and 3 are perspective views.

In producing the forms illustrated in the drawing, catalytic material having a composition within the specified range in a comminuted state is moistened with a chemically inert liquid sufficiently to permit it to be molded. It will be obvious that a great variety of liquids may be used. Oil and water are entirely satisfactory; either may be used or a mixture of the two, but water is preferred. The moistened material may then be forced, by suitable apparatus, into tubular form, and broken into sections of uniform size, as indicated at A in Fig. 1, or it may be molded in the form of a rod and cut into sections or blocks B, as indicated in Fig. 2. In both instances, the aim is to secure a substantially uniform wall thickness. The molded material is then dried and baked at a predetermined temperature for a suitable period in a stove. In any case the temperature does not exceed the normal temperature of regeneration by oxidation.

In order to increase the activity of the catalyst, the material may be subjected to chemical treatment either before molding or after the units are baked. Hydrosilicates outside the specified range may be reduced in certain cases to a composition within the scope of the present invention by such chemical treatment, especially when applied both before molding and after baking.

Figure 2:
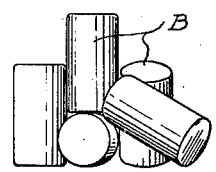
Figure 3:

In the liquid phase treatment of certain substances, it occasionally happens that the catalytic mass in the molded forms A and B of Figs. 1 and 2 does not produce the expected reaction. This appears to be due, at least in part, to resistance encountered in the compacted outer surface or "skin" formed on the mass as it is forced through the die of the molding machine. It further appears that the size of the catalytic unit is also an important factor. At any rate, the difficulty is entirely overcome by crushing the molded pieces and screening the fragments to secure units C (Fig. 3) of irregular shape, but of a size which is found by experiment to give the best results.

In some instances, I have found that improved results are secured by using a composite catalytic mass comprising a plurality of adsorptive materials rigidly united in the same unit, but so disposed that each exercises its selective adsorption and catalytic action independently of the other. An active or activated hydrosilicate of aluminum, of the range of composition noted above, is used as one catalyst, and the additional catalyst or catalysts may be selected from metallic oxides known to have adsorptive properties, such, for example, as the oxides of nickel, cobalt, copper, manganese, vanadium, molybdenum or mixtures of these different oxides. The catalysts are quite neutral toward each other, and in the combination the hydrosilicate is greatly in excess of the metallic oxide. For most purposes and by preference the proportions are 90% or more of the hydrosilicate to 10% or less of the metallic oxides.

The two catalysts, reduced to a fine powder and in the desired quantitative proportions, are thoroughly mixed while in a dry state, then a quantity of liquid is added to the mixture sufficient to make a paste. The liquid selected must be inert to and insoluble toward both catalysts, and, in the present instance, may be water. It does nothing more than moisten the mixture and enable it to be molded under pressure into the desired shape, such as that of catalysts A and B in Figs. 1 and 2. The molded masses or units are then baked to produce rigid elements, the same care being taken as to excessive temperature as with the material first referred to. After baking, the molded units may be crushed and sized, as indicated at C in Fig. 3.

It is to be noted that the composite catalyst, made in accordance with the process just described, differs radically from previously known combinations in which a metallic oxide is deposited on a clay or other carrier by impregnation of the clay with a solution of a metallic compound. In such a case, the metal fills the pores of the clay and proportionally diminishes any catalytic activity that the clay may have had originally.

By thoroughly mixing two active materials in a dry state and moistening the same with a liquid which is incapable of dissolving either the metal or the silicate, a homogeneous mass is secured in which both catalysts are closely associated, but each retains its activity and works entirely independently of the other.

Figure 4:
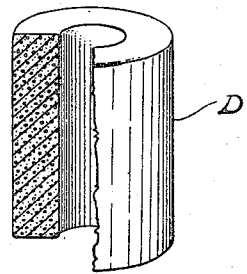
Fig. 4 is a view on an enlarged scale, partly in section, and diagrammatically indicating the composition of a modified form.

The association of the different catalytic particles within the rigid element is illustrated in Fig. 4, wherein an element D, of tubular form, like elements A of Fig. 1, is shown on an enlarged scale and partly in section. The arrangement of particles is indicated diagrammatically in the sectioned portion, wherein the circles indicate the particles of the hydrosilicate and the dots indicate the particles of the metal oxides.

In practice, the catalytic units herein described, either of the simple or composite type, are disposed in a chamber, in which they may be alternately subjected to the material to be transformed and to a regenerating medium. Any desired arrangement may be utilized, such, for example, as that disclosed in U. S. Patent No. 1,828,146, issued October 20, 1931, to Alfred Joseph. The catalytic masses or units are regenerated in situ. The regenerating medium will depend upon the kind of material which is transformed and the kind of poison which is retained by the catalyst. In certain instances, regeneration will be by oxidation, in which case care must be taken that the temperature in the catalytic chamber be not allowed to rise to a point where the catalytic activity of the hydrosilicate will be destroyed. If the catalyzed product itself stops the action of the catalyst, regeneration will consist in discharging the product from the catalyst by admitting a suitable medium for which the catalyst has a greater affinity than for the catalyzed product. In some cases, such a medium may be steam. In other instances, regeneration may be effected by subjecting the catalytic units to the action of a solvent for the poisons.

I claim as my invention:

1. A rigid homogeneous catalytic mass or unit for the conversion and treatment of hydrocarbons and adapted for frequent regenerations by oxidation without substantial loss of its selective adsorptive or catalytic activity formed of an active or activated hydrosilicate of alumina comprising $SiO_2$ and $Al_2O_3$ to the extent of at least 90%, these components being substantially in the ratio of 4:1, such material being molded under pressure, dried and baked to produce the catalytic mass or unit.

2. A rigid homogeneous catalytic mass or unit for the conversion and treatment of hydrocarbons and adapted for frequent regenerations by oxidation without substantial loss of its selective adsorptive or catalytic activity formed of an active or activated hydrosilicate of alumina comprising $SiO_2$ and $Al_2O_3$ to the extent of more than 90%, these components being substantially in the ratio of 4:1, and further comprising less than 3% iron oxide, such material being molded under pressure, dried and baked to produce the catalytic mass or unit.

3. A molded catalytic mass for the conversion and treatment of hydrocarbons and adapted for frequent regenerations by oxidation with little or no loss of catalytic activity comprising activated hydrosilicate of alumina, the silica content of which is at least three and a half times as great as the alumina content, the combined silica and alumina content being at least ninety percent of the whole mass, the remainder comprising mainly oxides of calcium, magnesium and iron but the iron oxide content being restricted to about one and one-half percent of said mass.

4. A catalytic mass for converting and treating hydrocarbons having selective adsorptive properties and capable of frequent regeneration in situ formed of an activated hydrosilicate of aluminum comprising the following components in substantially the given proportions:

| | Per cent |
|---|---|
| $SiO_2$ | 76 |
| $Al_2O_3$ | 16.8 |
| $Fe_2O_3$ | 1.6 |
| $CaO$ | 2.4 |
| $MgO$ | 1.3 |

5. A rigid homogeneous catalytic mass or unit adapted for the conversion and treatment of hydrocarbons and for regeneration in situ comprising a plurality of different and independent adsorptive materials in fixed but noninterfering relation, one of said materials being an active hydrosilicate of aluminum of which more than 90% by weight is $SiO_2$ and $Al_2O_3$ substantially in the ratio of 4:1 with an iron oxide content of about 1½%, and another of said materials being an oxide of an active metal other than those contained in said hydrosilicate of aluminum.

6. A rigid homogeneous catalytic mass or unit for the treatment of hydrocarbons and adapted for frequent regeneration by oxidation without substantial loss of its selective adsorptive or catalytic activity comprising a plurality of different and independent catalytic substances in fixed but non-interfering relation, one of said substances being an active or activated hydrosilicate of aluminum comprising $SiO_2$ and $Al_2O_3$ substantially in the ratio of 4:1 and together making up at least 90% of said hydrosilicate with a ferric oxide content of less than 3%, and the other or others of said substances being oxides of one or more of the group nickel, cobalt, copper, manganese, vanadium and molybdenum and making up 10% or less of the mass or unit.

7. A rigid homogeneous catalytic mass or unit for the conversion and treatment of hydrocarbons and adapted for frequent regeneration by oxidation without substantial loss of its selective adsorptive or catalytic activity comprising a plurality of different and independent catalytic substances in fixed but non-interfering relation, one of said substances being an active or activated hydrosilicate of aluminum comprising $SiO_2$ and $Al_2O_3$ to the extent of at least 90% in the ratio of at least 4:1 having a content of not more than 10% of oxides of iron, calcium and magnesium with the iron oxide making up less than 3% of said 10%, and the other or others of said substances being oxides of one or more of the group nickel, cobalt, copper, manganese, vanadium and molybdenum and making up 10% or less of the mass or unit.

EUGENE J. HOUDRY.